(12) United States Patent
Burlov et al.

(10) Patent No.: US 6,915,750 B2
(45) Date of Patent: Jul. 12, 2005

(54) PLASMA REACTOR-SEPARATOR

(76) Inventors: Jury Aleksandrovich Burlov, Podolsk, Donakaya ul. 13, Moscow reg., 142101 (RU); Ivan Jurievich Burlov, Podolsk, Plescheevskaya ul. 54 kv. 93, Moscow reg., 142101 (RU); Alexandr Jrievich Burlov, Podolsk, Plescheevskaya ul. 54kv. 93, Moscow reg., 142101 (RU)

( * ) Notice: Subject to any disclaimer, the term of this patent is extended or adjusted under 35 U.S.C. 154(b) by 0 days.

(21) Appl. No.: 10/493,284

(22) PCT Filed: Oct. 3, 2002

(86) PCT No.: PCT/RU02/00441

§ 371 (c)(1),
(2), (4) Date: Apr. 20, 2004

(87) PCT Pub. No.: WO03/089862

PCT Pub. Date: Oct. 30, 2003

(65) Prior Publication Data

US 2004/0250741 A1 Dec. 16, 2004

(30) Foreign Application Priority Data

Apr. 19, 2002 (RU) ......................................... 2002110356

(51) Int. Cl.$^7$ .............................. F23G 5/10; F23K 3/00
(52) U.S. Cl. .................................... 110/250; 110/101 R
(58) Field of Search ................................ 164/495, 514; 373/142, 156; 117/50, 51, 52; 266/242, 901; 110/250, 292, 101 R

(56) References Cited

U.S. PATENT DOCUMENTS

| | | | | |
|---|---|---|---|---|
| 3,616,767 A | * | 11/1971 | Southwick | 110/185 |
| 3,812,620 A | * | 5/1974 | Titus et al. | 48/65 |
| 4,416,723 A | * | 11/1983 | Pelts et al. | 117/3 |
| 5,416,793 A | * | 5/1995 | Hugo et al. | 373/142 |

FOREIGN PATENT DOCUMENTS

| | | |
|---|---|---|
| DE | 2 222 190 | 5/1972 |
| FR | 75 20766 | 2/1976 |
| RU | 1020738 A | 5/1983 |
| RU | 2 176 277 C1 | 11/2001 |

* cited by examiner

Primary Examiner—Kenneth Rinehart
(74) Attorney, Agent, or Firm—Frishauf, Holtz, Goodman & Chick, P.C.

(57) ABSTRACT

The invention relates to arc-heating plasma reactors for simultaneous making of refractory, metal and non-metal material melt and sublimates having a high degree of a melt viscosity and can be used in cement, chemical industries and metallurgy. The aim of the present invention is to provide the increase of a performance of a furnace lining, the serviceability, a furnace capacity, a finished product quality, the decrease of a power supply, making and separation of associated binding agents, non-ferrous metals in the form of melts and sublimates. Said aim is attained that in the present plasma reactor-separator for a melt making comprising a cylindrical chamber, the hollow bar electrodes passing into a chamber through its upper lid but the elements are set into their cavities in the form of shelves or in the form of a screw, a hole for bringing in and bringing out of a melt, two coils encompassing the chamber and set one above the other throughout its height, a channel for bringing out of the lighter binding agent melt is located between the hole for a metallic melt bringing out in the back surface of the chamber and the lower coil, a raw furnace charge is brought in by means of four side feeders, through the channels, located in the chamber walls at angle of 90° on the same horizontal plane relatively each other in the upper part of the chamber over a melt surface resulting in a skull formation as cone-shaped slopes on a melt mirror, the heat-exchange granulating elements (granulator) for cooling, granulation and utilization of a heat of a clinker melt made as metallic on the inside water-cooled cylinders revolving on their axis in the opposites directions from each other.

4 Claims, 1 Drawing Sheet

PLASMA REACTOR-SEPARATOR

This application is a U.S. National Phase Application under 35 USC 371 of International Application PCT/RU02/00441filed Oct. 3, 2002.

The invention relates to arc-heating plasma reactors for simultaneous making of refractory, metal and non-metal material melt and sublimates, preferably, of special types of clinkers of artificial binding agents having a high degree of a melt viscosity and associated non-ferrous metals and can be used in cement, chemical industries and metallurgy.

The plasma reactor-separator comprising a chamber having a cylindrical body, the hollow bar electrodes passing into the chamber through its hermetically sealed lid but the heat-exchange elements made in the form of inclined emptying shelves are set into the cavities of said electrodes slowing down a batch material falling and/or the impedimental heat-exchange elements made in the form of a screw, a hole for bringing out of a metal melt in the hearth, the upper and lower electromagnetic coils encompassing the chamber and set one above the other throughout its height. The upper coil is connected with a drive for a displacement of said coil relatively a longitudinal and cross-section of the cylindrical body of the chamber. The reactor is provided with rollers and a ring, said ring having a variable height relatively its lower surface forming on its upper surface a guiding track contacting with a lower plane of the upper coil by means of the rollers but a lower surface of the ring is rested upon a number of the rollers one of which is a leading one and is connected with a drive of the upper coil ensuring a rotary motion of the ring relatively said coil. An additional channel for bringing out of the lighter binding agent melt is located between the hole for bringing out of a metal melt in the back surface of the chamber and the lower coil. Four side feeders located in the chamber walls at angle of 90° on the same horizontal plane relatively each other in the upper part of the chamber over a melt surface for bringing in of a raw furnace-charge (10% of a total quantity of a furnace feed) resulting in a skull formation as cone-shaped slopes on a melt mirror allowing to avoid thermo-chemical corrosion of a furnace lining. The invention provides to improve substantially the service ability and the capacity of the reactor, a quality of finished product, to decrease power inputs at 30%.

The present invention relates to equipment for a simultaneous making of refractory, metal and non-metal materials and sublimates, preferably, of special types of clinkers of artificial binding agents, for example, a cement clinker having a high degree of a melt viscosity and associated metal alloys and can be used in cement industry.

Known in the present state of the art is equipment for a material melting, preferably, a cement clinker, comprising a cylindrical chamber, a bar element passing in the camber through its upper lid, a hole for bringing in of batch materials in the arch and bringing out of said materials in the hearth, two electromagnetic coils encompassing a chamber (certificate of invention USSR No. 1,020,738, MKL F27B 14/06, 1981).

The disadvantage of such equipment is unsatisfactory local mixing of a melt and as a result of it, unsatisfactory quality of a finished product, insecurity of a melt system and its separation on binding agents and metals as a tap-hole is common.

The nearest to the technical solution and achievable result is the plasma reactor for a material melting, preferably, a cement clinker, comprising a cylindrical chamber, the hollow bar electrodes passing in the chamber through its upper lid, a hole for bringing in of reagents in the chamber arch and bringing out of said reagents in the hearth, two electromagnetic coils encompassing a chamber and set one above the other throughout its height (Patent of Russian Federation No 2176277 C22 B 9/22, N 05 B 7/18 dated Nov. 27, 2001. Bulletin N33, application dated Dec. 28, 2000. (Author Yu. A. Burlov and others)).

The disadvantage of such equipment is a lack of installation tightness causing air inflows and oxidizing atmosphere in the working area of the reactor and resulting in electrode life decrease, thermo-chemical corrosion increase effecting negatively upon a furnace lining (there are lining burnings at the border with a melt mirror) and decrease of temperature at the border in the reactor area.

It is an object of the present invention to improve a furnace lining performance, a serviceability, a furnace capacity, a finished product quality, to decrease of power supply, making and selective separation of associated binding agents, non-ferrous metals in the form of melts and sublimates.

According to the present invention there is provided the plasma reactor for simultaneous making of refractory metal and non-metal material melt and sublimates, preferably, of special types of a clinker of artificial, binding agents in the form of a melt having a high degree of viscosity and associated non-ferrous metals comprising a cylindrical chamber, the hollow bar electrodes passing into a chamber through its upper lid but the heat-exchange elements made in the form of inclined emptying shelves are set into the cavities of said electrodes slowing down a batch material falling or in the form of a screw, a hole for bringing out of a metallic melt in the back surface of the chamber, the upper and lower electromagnetic coils encompassing the chamber and set one above the other throughout its height, the upper coil is connected with a drive for a displacement of said coil relatively a longitudinal and cross-section of a cylindrical body of the chamber, the reactor is provided with rollers and a ring, said ring having a variable height relatively its lower surface forming on its upper surface a guiding track contacting with a lower plane of the upper coil by means of rollers but the lower surface of said ring is rested upon a number of rollers, one of which is a leading one and is connected with a drive of the upper coil drive causing a rotary motion of the ring relatively said coil, an additional channel for bringing out of a melt of the lighter binding agents is located between the hole for bringing out of a metal melt in the hearth of the chamber and the lower coil, four side feeders located in the chamber walls at angle of 90° on the same horizontal plane relatively each other in the upper part of the chamber over a melt surface for bringing in of a raw furnace-charge (10% of a total number of a furnace feed) resulting in a skull formation as cone-shaped slopes on a melt mirror allowing to avoid thermo-chemical corrosion of a furnace lining, the heat-exchange granulating elements (granulator) for cooling, granulation and utilization of a clinker melt heat, made in the form of metallic on the inside water-cooled cylinders revolving on their axis in the other sides from each other.

Figure 1:
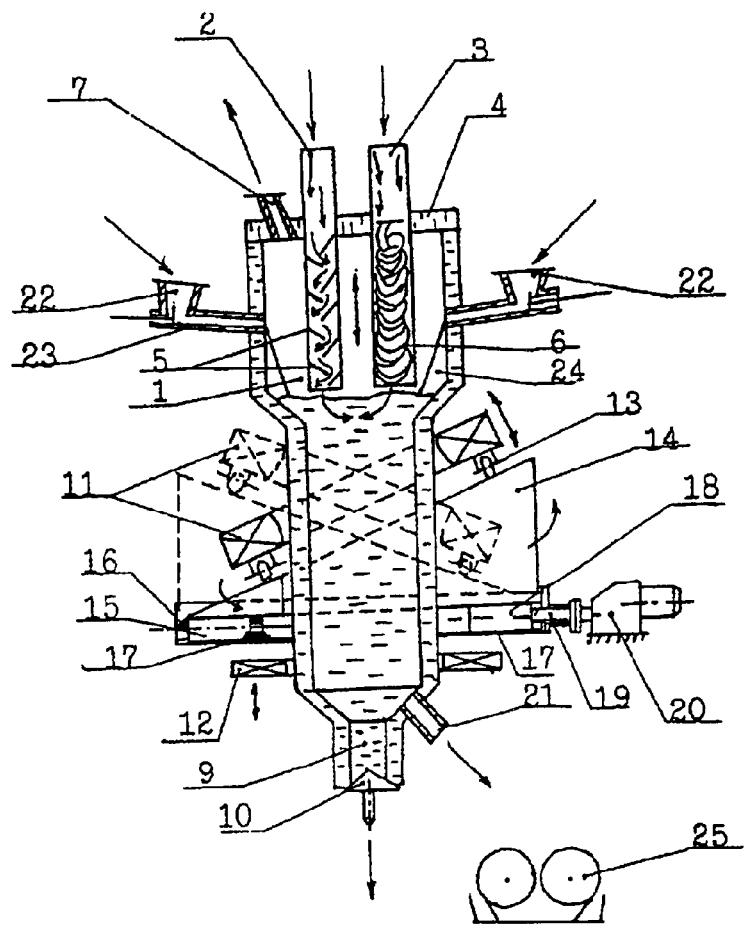
FIG. 1 depicts the plasma reactor-separator.

The plasma reactor-separator comprising (see FIG. 1) a water-cooled cylindrical chamber 1, the bar hollow electrodes 2 and 3 passing in the chamber 1 through its upper lid 4 but the heat-exchange elements made in the form of inclined emptying shelves 5 are set into the cavities of said electrodes slowing down a batch material falling. By that for ease working the electrode having a squared shape in a cross-section but the shelves can be inserted into the holes in the bar walls. The electrode 3 in its cavity can include an element in the form of screw 6 slowing down a falling of a batch material. The lid 4 is also equipped with a channel 7 for waste gases disposal including sublimates of non-ferrous metals and a tap-hole 8 for flaming slag introduction.

In the back surface 9 of the chamber 1 a valve 10 is located covering a tap-hole for bringing out of a metal melt. Throughout the height the upper 11 and the lower 12 electromagnetic coils are mounted one above the other encompassing a chamber 1, upper coil 11 is connected with a drive for its displacement relatively a longitudinal and cross-section of a cylindrical body of chamber 1.

The upper electromagnetic coil 11 is equipped with rollers 13 resting upon a plane of a guiding track 14. The lower part of a guiding track 14 in its turn is rested upon rollers 15 mounted on bearings 16. The bearings 16 are set into mantle ring 17 being rigid to the body of chamber 1. One of the rollers 18 which a guiding track is rested upon is a leading one and is connected with a motor-reductor 20 by means of shaft 19. The channel 21 for bringing out of a melt of the lighter binding agents, for example, a cement clinker, is located between a lower coil 12 and a valve 10. (Locking channel 21 and a valve conditionally are not shown).

Figure 2:
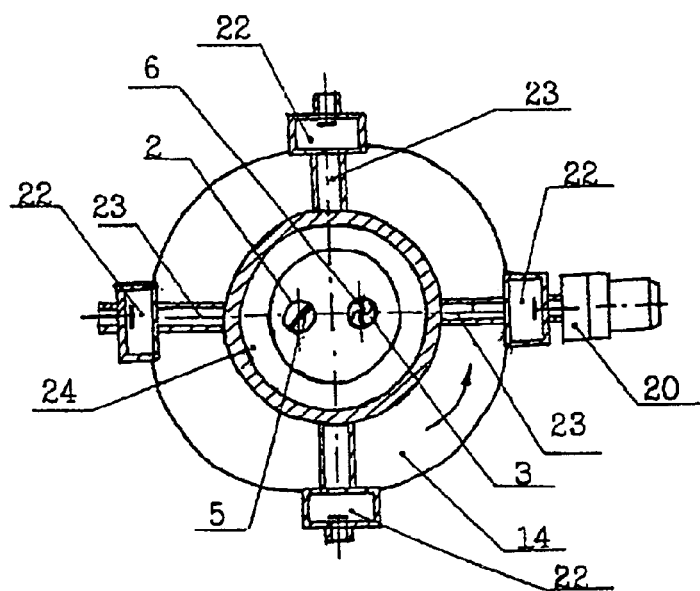
FIG. 2 depicts plasma reactor-separator (view from above).

Four side feeders 22 (see FIG. 2) for a raw furnace-charge bringing in (10% of a total number of a furnace feed) the channel 23 located in the walls of chamber 1 at angle 90° on the same horizontal plane relatively each other in the upper part of the chamber over a melt surface resulting in a skull 24 formation as cone-shaped slopes on a melt mirror.

Under the channel 21 there are metallic long cylinders 25 on the inside water-cooled, revolving on their axis in the other sides from each other designed for heat-exchange and granulation of binding agent melt.

The plasma reactor-separator operates in the following way:

The dry raw furnace-charge is brought in the channel 23 by means of the side feeders 22 located in the walls of the chamber 1 at angle 90° on the same horizontal plane relatively each other in the upper part of the chamber over a melt surface for a skull lining formation from the material itself at the border of a melt mirror resulting in a skull formation as cone-shaped slopes on a melt mirror thereby thermo-chemical corrosion of a furnace lining is excluded. The dry raw furnace-charge brought in the chamber 1 contains in calculated quantity the chemical compounds ensuring, when melting, the artificial binding agent production, for example, a cement clinker.

Using of wastes, for example, of chemical wastes and also metallurgical wastes as a raw material some quantity of non-ferrous metals is contained in wastes.

The electrode ends are brought together inside the chamber and pulled down in the lower part of chamber 1, below a lower coil 12. When a level of a batch material is raised up to electrode ends, a voltage is applied on said ends, for example, direct voltage from a transformer.

The electrode ends are brought together to contact. Pulling electrodes apart an electric arc discharge (arc) is formed constituting a low-temperature plasma. At the cost of it the material is heated in the chamber up to a melting temperature. In the process of a clinker burning a melting temperature reaches 2000–2100° C. When a level of a melt is raised over the lower coil 12 a voltage is applied on a block of said coil. The chamber walls are made of a non-magnetic material, for example, steel, containing a large quantity of nickel, chrome and titanium. The electromagnetic field produced as a result of a current passing through a coil acts upon a melt which becomes resistance in a liquid state. Temperature is hold at the achieved level (owing to an arc discharge) by means of inductive current. Material is fed through cavities of the electrodes 2, 3 when a melt mass is increased and the electrodes are warmed-up over 1000° C. inside the chamber. By that in the electrode 2 a batch material is emptied from a shelf on a shelf 5 which are warmed up to temperature being close to the electrode temperature. At a relatively slow (in comparison with a vertical fall) displacement of a material and having a direct contact with a heated surface of the shelves a heat is transferred from shelves to said material and said material (preliminary warmed-up) brought to temperature of carbonate dissociation falls into the melt surface and is melted having a greater rate as in this case exothermal reactions already go releasing a heat. By that an efficiency of a melting chamber is being increased. A batch material is also heated in the electrode 3 but in this case a heating takes place when the material is moving along a helical surface. When a melt is raised above a coil 11 a voltage is applied on said helical surface. By that a motor-reductor 20 is turned on. Through a shaft 19 a rotary motion is transferred to a roller 18 which closely contacting with a lower surface of a guiding track 14, in its turn, set said guiding track into a rotary motion on the rollers 15 relatively a roller bearing 17 of a cylindrical surface of the chamber 1 and the coil 11 owing to the fact that the coil 11 is mounted on the rollers 13 contacting with the upper surface of a guiding track 14, to a holding of a coil from a turn around a body of a chamber 1 (a holding device conventionally isn't shown on fig.). The rotation of a guiding track promotes an oscillatory motion of the coil 11 in the planes crossing a longitudinal (vertical) axis of the furnace. The magnetic field also changes its position during oscillatory motions of a coil 11, said magnetic field is produced inside a resistance melt being actively mixed and additionally heated. As a result of a melt mixing for the account of a revolving magnetic field produced by means of a three-phase coil and of an oscillatory motion of coil itself a melt is homogenized that actively promotes the increase of a plant capacity and improving a basic production, for example, a cement clinker. A rate of stirring is set by a rate of a magnetic field change and is dependent on frequency and power of an alternating current and a mechanical oscillation speed of the coil which in its turn is dependent on the speed of a guiding track rotation. The rate of stirring is controlled in dependence of a melt viscosity but said viscosity—in dependence of temperature of said melt. Having the data on a melt temperature one can also set a speed of a coil 11 oscillations.

For making of a cement clinker when melting a furnace charge containing a small amount of rare metals, some of said metals whose melting temperature is slightly higher than a clinker melt (in exception of tungsten and molybdenum) settle in the back surface 9 of a chamber 1 over a valve 10 and periodically are released in the moulds. A metal deposition takes place for the account of the fact that their density minimum in two times higher than a density of a clinker melt.

The vapors of easily sublimable rare metals (for example, lithium) together with carbon dioxide evolved as a result of carbonaceous component decarbonization of a clinker furnace charge are released under action of discharging in the channel 7 in special separation devices where vapors of metal oxides are condensed but carbon dioxide can be used for making of artificial ice or can be again brought in the reactor through the electrodes by means of a special supercharger. Sublimates of metal oxides are further processed into a qualified product manufacture.

Four side feeders 22 through channels 23 located in the chamber 1 walls at angle 90° on the same horizontal plane relatively each other in the upper part of the chamber over a melt surface for bringing of a raw furnace charge in (10% of a total quantity of a furnace feed) resulting in a skull formation as cone-shaped slopes at the periphery of a melt mirror allowing to avoid thermo-chemical corrosion of furnace lining.

A clinker melt periodically or continuously (at coordinated bringing of a raw material in the chamber 1) is poured in the granulator for a heat recovery of a melt and a granulation of said melt. A granulator is constructed in the form of on the inside water-cooled metallic cylinders 25 revolving on their axis in the other sides from each other. (A coil 12 can be shifted in the channel 21 area for a clinker melt viscosity decreasing).

A cooled off clinker is reduced to fragments to make a cement. So, for the account of a preliminary thermal treatment of a furnace charge the herein—proposed equipment allows to improve productivity but for the account of an active stirring and a speed control of a melt cooling—to upgrade quality, variety of finished product properties. At the same time a reactor embodiment provides to manufacture co-products in the form of their melt and sublimates.

What we claim is:

1. A plasma reactor-separator for simultaneous making of refractory metal and non-metal material melt and sublimates comprising:

a chamber having a cylindrical body, hollow bar electrodes passing into the chamber through its upper sealed lid, heat-exchange elements slowing down a batch material falling are set into electrode cavities, a channel for waste gas evacuation and sublimates is located in the sealed lid, a hole for bringing out of a melt of refractory metallic materials in a back surface of the chamber, upper and lower electromagnetic coils encompassing the chamber and set one above the other throughout its height, said upper coil is connected with a drive for a displacement of said coil relatively a longitudinal and cross-section of a cylindrical body of the chamber, a channel for bringing out of refractory non-metallic material melt is located between a hole for bringing out of refractory metallic material melt and a lower coil, rollers and a ring, said ring having a variable height relatively its lower surface forming on the upper surface of said ring a guiding track contacting with a lower plane of the upper coil by means of the rollers, the lower surface of the ring is rested upon a number of rollers, one of which is a leading one and is connected with a drive of the upper coil ensuring a rotary motion of the ring relatively said upper coil, wherein it is provided with four side feeders having channels for bringing in of a part of a dry batch material and for a skull formation as cone-shaped slopes on a furnace lining at a border of a melt mirror, said channels are located at angle 90° on the same horizontal plane relatively each other in the upper part of the chamber over a melt surface.

2. The plasma reactor-separator as claimed in claim 1, further comprising a heat-exchange granulating elements (granulator) for cooling, granulation and utilization of heat of a clinker melt made as metallic cylinders, said cylinders are water-cooled from the inside and revolving on their axis in the opposites direction from each other.

3. The plasma reactor-separator as claimed in claim 1 wherein, the heat-exchange elements are made as inclined emptying shelves.

4. The plasma reactor-separator as claimed in claim 1, wherein, the heat-exchange elements are made as a screw.

* * * * *